United States Patent [19]

Hicks et al.

[11] Patent Number: 4,600,923
[45] Date of Patent: Jul. 15, 1986

[54] REMOTE METER DISPLAY UNIT

[75] Inventors: Irwin A. Hicks, Radnor; Joseph P. Schroeck, Cheltenham, both of Pa.

[73] Assignee: American Meter Company, Philadelphia, Pa.

[21] Appl. No.: 607,078

[22] Filed: May 4, 1984

[51] Int. Cl.⁴ .............................................. G08B 21/00
[52] U.S. Cl. ........................... 340/870.02; 340/870.07
[58] Field of Search ................. 340/870.02, 870.03, 340/870.09, 870.20, 826.65, 870.07; 200/19 M

[56] References Cited

U.S. PATENT DOCUMENTS 3,599,194  8/1971  Lipscomb ........................ 340/870.02
4,337,466  6/1982  Spahn ........................ 340/870.02 X Primary Examiner—Jerry W. Myracle
Attorney, Agent, or Firm—David L. Davis; Robert E. Smith; Edward L. Bell

[57] ABSTRACT

A remote meter display unit is connected to a meter index through a magnetically actuated single pole double throw switch cooperating with a magnet mounted on an index pointer shaft. The remote display unit is configured to increment a counter whenever the switch toggles. If the switch or any of the wires connected thereto are disconnected or shorted, the display is reset and maintained at zero. A portable reset/preset unit mates with the remote display unit and includes switches for resetting the remote unit and entering any desired number into the display.

11 Claims, 10 Drawing Figures

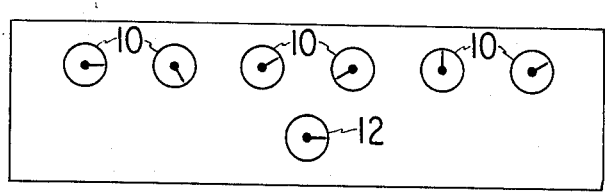
Fig. 1A
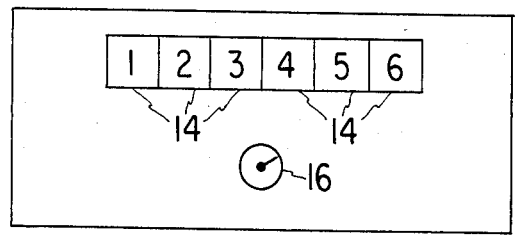
Fig. 1B
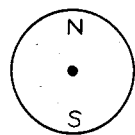 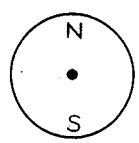 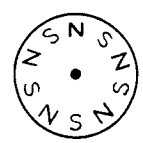 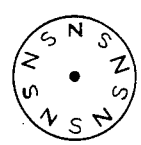
Fig.2A    Fig.2B    Fig.2C    Fig.2D
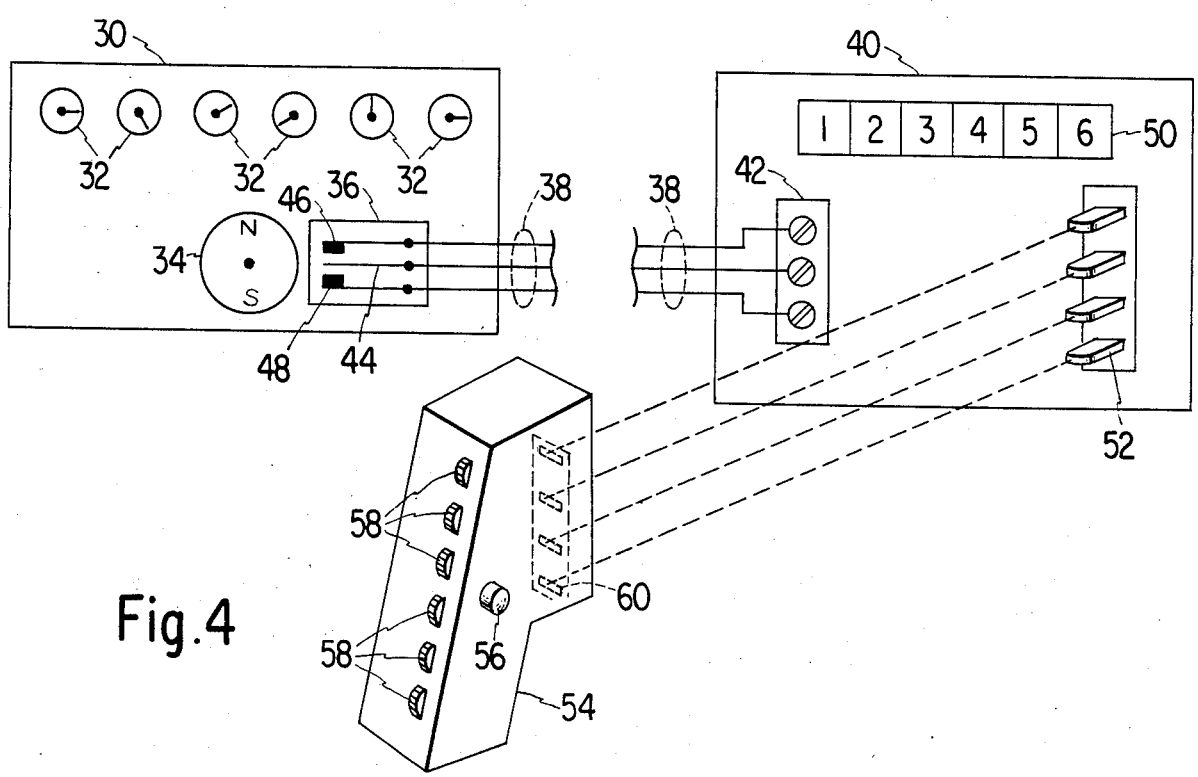
Fig. 4

REMOTE METER DISPLAY UNIT

BACKGROUND OF THE INVENTION

This invention relates to utility meters and, more particularly, to a display unit for reproducing the reading of such a meter at a location remote from the meter.

Electric, gas and water meters have to be read to determine the charges for the amount of product which has been consumed. The interval between readings may be hours, days, or months and represents, to the utility, product delivered to the consumer on credit. When the meter is not read at the specified time interval, this results in increased accounts receivable to the utility, which means lowered profit margins. It has been found that a difficult to read meter can result in additional administration expense equal to five to ten times the cost of routine meter reading. Thus, the inability to read a meter can be a major and costly problem to the utility.

Many meters are inaccessable to the utility's meter reader either on a random or continuous basis. While electric meters are almost universally mounted outside a dwelling or building, actual accessability may be limited due to such impediments as a fence, a vicious dog or being in a hazardous area. Gas meters were always mounted indoors until the advent of corrosion resistant and temperature compensated meters allowed exterior mounting. Even in such case, there still may be an accessability problem like electric meters. Water meters are almost always mounted indoors where there is even the slightest chance of freezing. Indoor meters almost always result in, at best, infrequent inaccessability.

Indoor meter inaccessability is a rapidly increasing phenomenon. Due to increasing crime rates, access to a dwelling or building is more frequently limited. Due to working families, the dwelling may be locked up. Due to increased mobility, there may not be anyone home. Consequently, utilities, especially gas and water utilities, have resorted to the major expense of relocating the meter to an accessable location outside or behind a window or have installed remote meter reading devices.

A remote meter reading device is a device mounted on the meter, generally connected to the index, which is further connected in some manner to an accessable display which reproduces the meter reading. Such remote meter reading devices vary considerably in design but generally fall into one of three types:

1. Direct Mechanical Link

The most common version of this type of remote reading device is a speedometer cable connected to the meter index on one end and a duplicate index in an accessable location on the other end. While simple and relatively low in cost, such a device is difficult to install, very limited in distance between meter and display (only several feet), is prone to mechanical failure, imposes significant and variable load on the meter which may significantly alter accuracy, and setting the remote unit numbers to correspond to the meter index is difficult.

2. Pulser

This commonly used type of remote meter reading device consists of a spring mechanically wound by the meter over a period of time and then released to obtain a high rotational velocity for a connected alternator whose resultant electrical "pulse" is transmitted over an electrical conductor to a remote accessable reading device having a solenoid activated mechanical counter. The advantage of this type of device is ease of installation, minimal effect on meter accuracy, considerable freedom on location of the accessable display (up to 200 feet is typical) and moderate cost. Disadvantages are lack of application to various meter manufacturers, difficulty in setting remote unit numbers to correspond to the meter index, a low data rate due to the winding period so that it is difficult to determine whether the meter or the remote device is working since the output is generally a ratio of 1/100 the meter output, and susceptibility to failure or missed pulses. In some cases, missing pulses may actually be a case of intentional disconnection by the customer for product theft.

3. Digital Encoder

An older version of remote meter reading devices consists of multi-contact switches connected to generally four of the index pointers (10 contacts per 4 pointers plus a common ground results in 41 output wires). These wires are connected to the remote device at an accessable location wherein each of the wires, except the common ground, is interrogated to determine the locations of the meter's index pointers. While this arrangement avoids the problem associated with pulsers and has no effect on meter accuracy, it is unreliable due to, for example, switch contact corrosion. Further, it is limited to pointer type indexes, it lacks application to various meter manufacturers, it has a low data rate since the selected pointers are the most significant digits, and the cost of installation with 41 wires can be significant. To avoid installing 41 wires, additional hardware would be required to encode the 40 possible positions to an electronic serial pulse train usable over two wires. Such a device would require expensive installation of line power to the meter.

Accordingly, it is a primary object of this invention to provide an improved arrangement for displaying the reading of a meter at a location remote from the meter.

It is a further object of this invention to provide such an arrangement which is easily adaptable to any kind of meter without regard to size or manufacturer.

It is another object of this invention to provide such an arrangement which imposes no load on the meter that might cause inaccuracy.

It is a further object of this invention to provide such an arrangement which requires no connection to line power, telephone lines, etc.

It is still another object of this invention to provide such an arrangement wherein there is great flexibility in locating the remote display unit.

It is yet another object of this invention to provide such an arrangement which requires no more than three wires between the meter and the remote display unit.

It is another object of this invention to provide such an arrangement wherein the remote display unit is easily settable to the meter index reading.

It is still a further object of this invention to provide such an arrangement having a significant data rate to indicate meter operation.

It is yet a further object of this invention to provide such an arrangement which is highly reliable and accurate in transmitting the meter reading.

It is a further object of this invention to provide such an arrangement which provides an indication of product theft.

It is yet another object of this invention to provide such an arrangement which is low in initial and maintenance costs.

It is a further object of this invention to provide an arrangement which is readable by the meter reader without the requirement for activation or special tools or devices to accept data.

It is yet another object of this invention to provide such an arrangement which operates in all environments of temperature and weather.

It is a further object of this invention to provide such an arrangement which prevents tampering with the meter or the remote display unit.

SUMMARY OF THE INVENTION

The foregoing and additional objects are attained in accordance with the principles of this invention by providing an arrangement for displaying the reading of a meter at a location remote from the meter comprising switching means at the meter adapted to alternately close one of a pair of circuits each time a measured volume of metered product passes through the meter, a respective conductor connected to each of the circuits and extending to the remote location, a multi digit display unit, counting means coupled to the display unit for causing the display unit to display digits corresponding to the contents of the counting means, the counting means having a count input and a reset input, the counting means responding to a count signal at the count input for incrementing its contents and responding to a reset signal at the reset input for setting its contents to a predetermined value, pulse means coupled between the conductors and the count input for generating the count signal, and fault detection means coupled between the conductors and the reset input for generating and thereafter maintaining the reset signal when neither of the circuits is closed.

In accordance with an aspect of this invention, the fault detection means is further effective to generate and thereafter maintain the reset signal in the event both the circuits are closed.

In accordance with a further aspect of this invention, the switching means includes a single pole double throw switch having a movable pole and two fixed contacts and wherein the conductors include a respective conductor connected to the poles and each of the contacts, the arrangement further including a source of voltage coupled to the pole conductor and the pulse means is connected to the contact conductors.

In accordance with another aspect of this invention, the meter includes a proving circle rotating on a shaft and the switching means includes a radially polarized circular magnet mounted axially on the shaft for rotation therewith.

In accordance with yet another aspect of this invention, the arrangement further includes manually controllable reset means for resetting the fault detection means to terminate the generation of the reset signal.

In accordance with still a further aspect of this invention, the arrangement further includes count setting means coupled to the counting means for providing the facility for manual entry of a predetermined count content into the counting means.

In accordance with a further aspect of this invention, the reset means and the count setting means are both included within an enclosure which is portable with respect to the remote display unit, the remote display unit including a connector coupled to the fault detection means and the counting means and the portable enclosure including a connector adapted to mate with the connector of the remote display unit.

In accordance with still a further aspect of this invention, all power for the portable enclosure is supplied by the remote display unit through the connectors.

BRIEF DESCRIPTION OF THE DRAWINGS

The foregoing will be more readily apparent upon reading the following description in conjunction with the drawings wherein like elements in different figures thereof have the same reference character applied thereto and in which:

FIGS. 1A and 1B schematically depict illustrative meter indexes to which apparatus constructed in accordance with the principles of this invention may be connected;

FIGS. 2A, 2B, 2C and 2D schematically illustrate arrangements for generating various numbers of switch closures for each single revolution of a rotating magnetic member;

FIG. 3 illustrates a universal switch mounting arrangement for use with this invention;

FIG. 4 schematically illustrates apparatus incorporating the principles of this invention;

DETAILED DESCRIPTION

Figure 5:
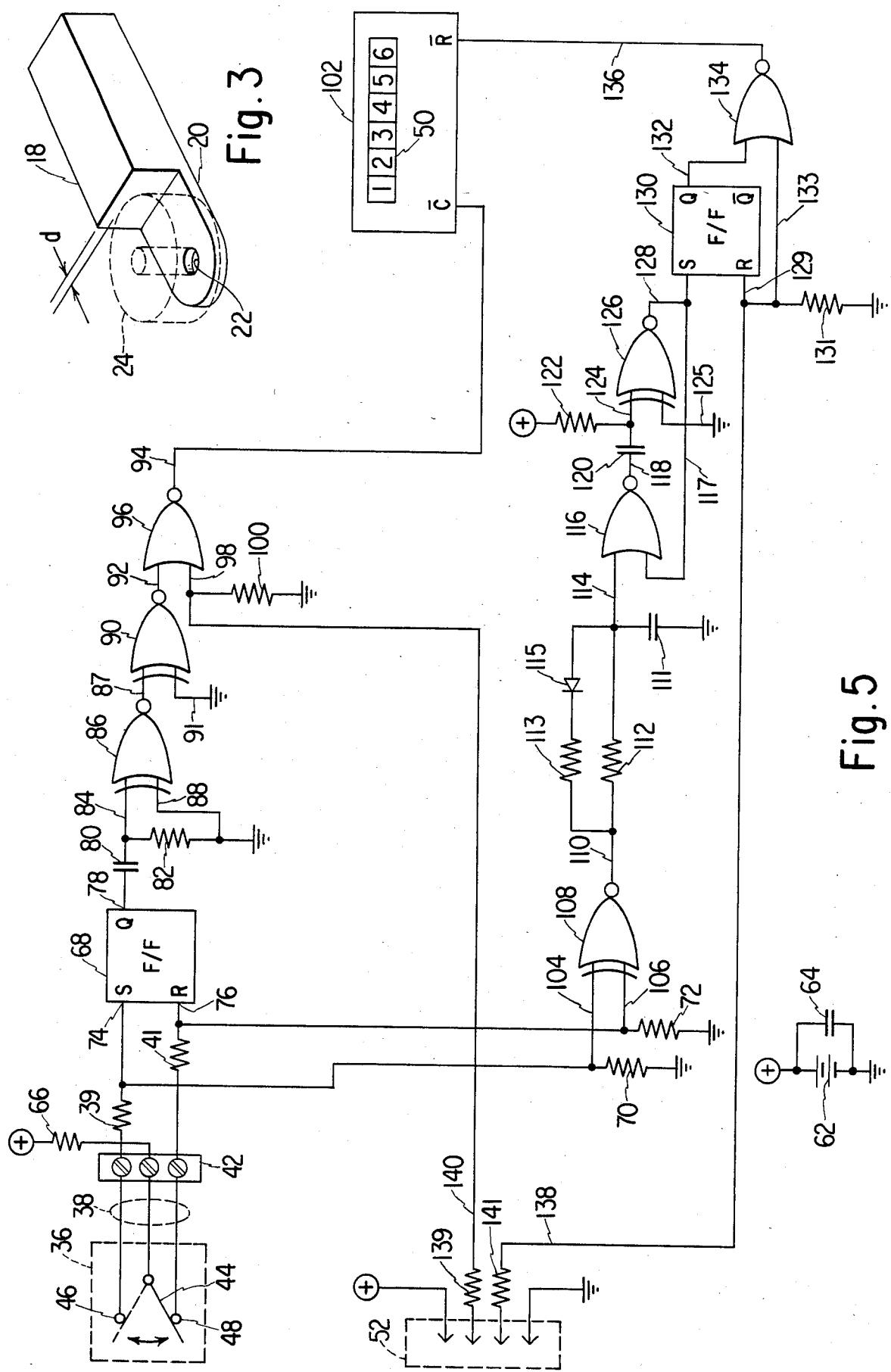
FIG. 5 is an electrical schematic circuit diagram showing illustrative circuitry which may be utilized in accordance with the principles of this invention in a remote display unit.

All meters have a readout device, which is commonly referred to as an index. There are two commonly used versions of an index; the pointer and the odometer. A pointer index has pointers mounted to a common shaft with generally a 10:1 reduction gearing allowing digital reading of totalized volume of delivered product. FIG. 1A illustrates a pointer index having a row of reading pointers 10 and a proving circle pointer 12. As is well known in the industry, the proving circle 12 makes a full revolution for a very small increment of the measured product, thus allowing the meter to be "proved", or calibrated, in a short time span, but the small volume indicated by the proving circle 12 is not usable for billing purposes. FIG. 1B illustrates an odometer index having numbered wheels 14 which allows direct reading of the totalized volume of the delivered product. The odometer index also typically includes a proving circle 16.

If a magnet is attached to any of the rotating index elements, it can be used to close a switch such as a magnetically operated reed switch. However, it is desirable to have such magnet and reed switch combinations result in switch closures which are digital so that a common remote display can be easily constructed and standardized. For example, an electric meter having index pointers can be used to create various numbers of switch closures per revolution by utilizing a circular magnet with different numbers of poles. Thus, a two pole circular magnet as shown in FIG. 2A, will result in two switch closures per revolution. FIG. 2B illustrates an arrangement wherein a biasing magnet is used in conjunction with the two pole circular magnet to achieve one switch closure per revolution. FIG. 2C illustrates an arrangement with a ten pole circular magnet wherein there are ten switch closures per revolution and FIG. 2D illustrates an arrangement with a ten pole circular magnet and a biasing magnet to effect five switch closures per revolution. It should be noted that the magnet and switch combination can be put on any pointer shaft to allow the scale of the closures to be tailored to the desired significant numbers for reading purposes.

Gas meters can have a similar switch closure arrangement but must be specifically tailored to the various scales utilized in the industry. Thus, commonly used pointer scales for gas meters are 1 cubic foot per revolution, 2 cubic feet per revolution, 5 cubic feet per revolution, 10 cubic feet per revolution, 100 cubic feet per revolution, and 1,000 cubic feet per revolution. To provide the highest data rate, the lowest pointer value should be used. The 1 cubic foot per revolution (or any power of 10) can be obtained by using the arrangements shown in FIG. 2B or 2C to obtain 1 closure per revolution or 10 closures per revolution times the pointer value. Two cubic feet per revolution can be obtained by using the arrangement shown in FIG. 2A. Five cubic feet per revolution can be obtained by using the arrangement shown in FIG. 2D. With these combinations, depending on the particular meter, a digital closure rate can always be obtained. However, some odometer indexes do not have a proving circle. These indexes will have a proving wheel and the magnet and switch combination would have to be adapted to that configuration.

In the original manufacture of some meters, such magnet/biasing magnet/switch arrangements have been used for some time, generally on various mechanism shafts or on the end of digital counters. Such systems, however, are not retrofittable on meters. A feature of the present invention which aids universal adaptation to meters having a pointer type shaft is in the design of a switch molding which may be retrofit onto virtually all meters with proving circles. Such a switch is shown in FIG. 3 wherein the switch is mounted within the housing 18, which housing has a spacing tab 20 extending therefrom. The spacing tab 20 is formed with an aperture 22 through which the pointer shaft of the meter's proving circle may extend. Thus, when installing the switch, the proving circle pointer is removed from its shaft and the spacing tab 20 is fitted thereover. The circular magnet 24 is then press fit onto the pointer shaft. The spacing "d" of the magnet 24 to the switch within the housing 18 is critical and a potential source of installation difficulty or lack of in-use reliability. The spacing tab 20 with the pointer shaft locating hole 22 avoids such potential problem. The tab 20 also acts as a "failsafe" feature should the adhesive on the housing 18 fail. In such case, the housing 18 may move to a new angular position but works perfectly since its spacing to the magnet is maintained.

As has been mentioned, the arrangement shown in FIG. 3 is intended to fit within existing enclosures over the index. To install that arrangement, the index cover is removed, the pointer is removed, and the housing 18 is positioned by the pointer shaft locating hole 22 over the pointer shaft. The housing 18 is secured adhesively (for example, by a self adhesive on the housing covered by removable paper flaps), the magnet 24 is secured to the pointer shaft and the enclosure cover is then replaced. This arrangement is intended to meet the objectives of universal applicability, ease of installation, and low cost. Because the switch is activated at rates resulting in life expectations exceeding 20 years, the objective of reliability is met. Because the switches are dry contact, the objective of wide operating temperatures is met. Further, these switches do not require installation to line power, cable, telephone, etc., do not require large numbers of cables to the remote unit and are reliable even at data rates 100 times that of pulser type remote devices.

FIG. 4 is a schematic diagram showing how the switches are connected and their use. Thus, the meter index 30 includes a plurality of reading pointers 32. The proving pointer is replaced by a radially polarized circular magnet 34 and a switch 36 is located adjacent thereto, in the manner described with respect to FIG. 3. Illustratively, the switch 36 is a form C single pole double throw magnetically actuated proximity sensor of the type manufactured by Hamlin, Inc., of Lake Mills, Wisc. Thus, the switch 36 has three wires 38 extending therefrom. The wires 38 may be of any desired length and extend from the switch 36 to a remote location where the remote display unit 40 is installed. The wires 38 are connected to the remote display unit 40 via the terminal strip 42.

As previously described, whenever a pole of the magnet 34 passes the switch 36, a switch closure occurs. However, since the switch 36 is a form C single pole double throw switch, each time a pole of the magnet 34 passes the switch 36 the movable pole 44 alternately toggles between the fixed contacts 46 and 48 so as to alternately close one of the two circuits formed by the three wires 38, with the wire connected to the movable pole 44 being common to both of those circuits. Thus, assuming the magnet 34 is rotating in a clockwise direction, as either magnetic pole passes the switch 36, the movable pole 44 is first drawn to fixed contact 46 and then to fixed contact 48, where it remains until the next magnetic pole passes the switch.

The terminal strip 42 is connected to circuitry within the remote display unit 40. This circuitry performs four functions. The first function is to respond to switch closures and increment the display 50 each time there is a closure of one of the circuits formed by the switch 36 and the wires 38. The second function is to cause the display 50 to be reset to some predetermined value whenever any of the three wires 38 are disconnected or shorted together. This function is a fault detection function and maintains the reset value even after the wires 38 are reconnected. Thus, the remote display unit 40 is vandal resistant. The third function is to allow a separate circuit to be connected to the remote display unit 40 via the pin connector 52 to reset the display 50. The fourth function is to allow that separate circuit to provide a predetermined number of input pulses to preset the display 50. As will be described in more detail hereinafter, the separate circuit is contained within a portable enclosure 54 and includes a reset button 56 and a plurality of thumb wheel decimal switches 58, one for each of the decimal places in the display 50, through which an installer or investigator can set a desired number into the display 50. The portable enclosure 54 includes circuitry connected to connector 60 adapted to mate with the pin connector 52 only in one specific orientation.

Before describing detail of the operation of the remote display unit 40 and the portable reset/preset unit 54, it is useful to understand the purpose of the circuits and what they accomplish as a system. When the magnet 34 is rotated in either direction, toggling of the switch 36 causes the remote display 50 to be incremented. The fact that the display 50 is always incremented is a very useful feature because one of the major methods of product theft is reversing the meter or running it backwards by some method. Also, because the magnet/switch arrangement always results in a digital unit of product output, a digital display can be used. Another common means of product theft is disconnection of the meter to run it backwards or to bypass it. Since it is intended that the connecting wires 38 be disconnected before a meter is disconnected from service by making the wires taut to the connection (in effect using the wires as meter "sealing wires") and/or providing a disconnection connector convenient to the meter, it is most likely that a product thief would either disconnect the connector or cut the wires. The second function described above then causes the display 50 to go to and remain at some predetermined value, for example, all zeros. This is evidence to the meter reader that the meter user has been tampering with the unit but the unit is still operational and powered. Typically, a utility would then send out an investigator to determine whether the disconnection was accidental or fraudulent and remove the meter or repair the connection and reset the remote display after re-reading the meter to determine the appropriate number.

Since a major concern of the utilities is the prevention of product theft, the reset/preset capability should only be available to the utility itself. It is for this reason that the reset/preset function is provided in a separate unit 54 controlled by the utility. Thus, there is no reset/preset circuit in the remote display unit 40 and only an enclosed pin connector 52 is provided on the remote display unit 40. Another reason for this arrangement is a much lower cost remote display unit, as unit cost is very sensitive since a remote display unit is associated with every meter. Providing the ability to externally access this connector is avoided because of potential tampering and because of weather environment. Thus, all components are contained in a weather proof enclosure where mounting screws, terminals, and connectors are all enclosed to avoid tampering and to obtain weather proof status.

The reset/preset unit 54 is a device that connects to the reset/preset pin connector 52 of the remote display unit 40, which connector is accessed by removing a cover having tamper resistant features. The reset/preset unit 54 derives its power from a battery within the remote display unit 40 and contains settable digital switches 58 which the utility's investigator or installer sets in accordance with the reading obtained from the meter index 30, after correcting the cause of disconnection. The reset/preset unit 54 also includes a reset button 56 which activates the circuitry performing the third function of the remote display unit 40 (described above) to reset the display 50 and contains a downcounter circuit to feed pulses to the remote display unit 40 to accomplish the fourth function described above. The number of pulses corresponds to the setting of the switches 58. This method of resetting the remote display unit 40 is very fast and very convenient compared to current methods of reassembling a remote mechanical counter.

Referring now to FIG. 5, shown therein is a schematic diagram of circuitry illustratively implementing the above-described functions for the remote display unit 40. Power for the remote display unit 40 (and also for the portable reset/preset unit 54) is supplied by the battery 62, which is preferably a lithium chemistry unit having sufficient energy to power the device for over 15 years in environments of wide temperature fluctuations to account for outdoor service. The battery 62 and its ground is in parallel connection with the capacitor 64 which provides protection from "spikes" which are caused when devices are attached to terminals or connectors.

The switch 36 is mounted on the meter index and is connected to the terminal strip 42 through the wires 38. The movable pole 44 of the switch 36 is connected to the battery 62 through a resistor 66 of high resistance value to limit current through the switch 36 for safety at the meter, for long switch contact life and to limit power consumption. In addition, the other inputs from the switch terminal 42, connected to switch contacts 46 and 48, are protected by blocking resistors 39 and 41 to prevent possible static electricity damage to flip flop 68. The fixed contacts 46 and 48 of the switch 36 are connected to the inputs of the flip flop 68 as well as to ground through the resistors 70 and 72, respectively. Thus, the inputs 74 and 76 of the flip flop 68 are always opposite in nature, one is high and the other is low. Assume at this time that the signal on the input 74 is low and the signal on the input 76 is high, with the movable pole 44 being in the position shown by the solid line. When a pole of the magnet 34 approaches the switch 36, the movable pole 44 moves to the position shown by the broken line so that it is in contact with the fixed contact 46 instead of the fixed contact 48. The signal at the input 74 will then become high and the signal at the input 76 will become low. The output 78 of the flip flop 68 will then go high. This high signal will pass through the differentiating circuit made up of the capacitor 80 and the grounded resistor 82 to provide a short high pulse at the input 84 of the exclusive NOR gate 86. When the signal on the lead 84 is high, the output 87 of the gate 86 is low, since the other input 88 is grounded and thus always low. When the output 87 of the gate 86 is low, the output of the exclusive NOR gate 90 is high as the other input 91 is grounded and thus always low. Thus, whenever a magnetic pole approaches the switch 36, there is generated a high pulse on the lead 92. As the magnetic pole passes the switch 36, the movable pole 44 returns to the position shown by the solid line and the output 78 of the flip flop 68 returns low. Since the lead 84 is tied to ground through the resistor 82, this change of state of the flip flop 68 does not generate any additional pulses. Accordingly, a single high pulse is generated on the lead 92 each time a magnetic pole passes the switch 36.

The high pulse on the lead 92 becomes a low pulse on the lead 94, which is the output of the NOR gate 96, since the input 98 is tied to ground through the resistor 100. At this point, it is noted that the exclusive NOR gates 86 and 90 are not required from a logic standpoint but they serve to filter and enhance the signals from the flip flop 68.

The lead 94 is connected to the count input of the display counter module 102, which illustratively is a CMOS integrated circuit including the display 50 and advances one count of the display 50 in response to a low pulse on the lead 94. Illustratively, the display counter module is a commercially available Sub Cub No. 1, manufactured by Red Lion Controls of York, Pa. The aforedescribed circuitry, together with the arrangement of the magnet 34 and the switch 36 mounted on the meter index 30, acts as a product theft detector. Irrespective of the direction of rotation of the magnet 34, the switch 36 and the aforedescribed circuitry always adds a count to the display 50 and can never subtract a count. Thus, a product thief who runs the meter in reverse and notes with satisfaction that the meter index has indeed reduced the accumulated count, will be surprised by the reading on the display 50 of the remote display unit 40. The display 50 will not only show the total product utilized but, in addition, shows the amount ostensibly removed from the meter. Eventually, when the reading of the display 50 is compared to the reading on the meter index pointers 32, the higher number on the display 50 is prima facie evidence of attempted product theft by meter reversal since there is no other way this circumstance could occur.

The remaining circuitry shown in FIG. 5 detects when the switch 36 or the wires 38 have been tampered with. Under normal operating circumstances, the inputs 104 and 106 of the exclusive NOR gate 108 have opposite signals thereon. Thus, the output 110 of the exclusive NOR gate 108 is normally low. The differentiating circuit made up of the grounded capacitor 111 and the resistor 112 is for the purpose of filtering out switch transients (bounce) which occur when the movable pole 44 moves from one of the fixed contacts 46 or 48 to the other. Thus, the signal on the lead 114 should remain low. In the event the switch 36, or any one of the wires 38, is removed between the terminals 42 and the switch 36, both the inputs 104 and 106 to the exclusive NOR gate 108 will be low and the signal on the output lead 110 will be high until it is bled off by the network consisting of diode 115 and resistor 113. Similarly, if all of the terminals on the terminal strip 42 are shorted together, both of the inputs 104 will be high, also making the signal on the lead 110 high, and consequently providing a high signal on the lead 114. With a high signal on the lead 114, which is an input to the NOR gate 116, there will be a low signal on the lead 118. After pulse shaping by the capacitor 120 and the voltage drop through resistor 122 which is connected to the battery 62, a low pulse will appear at the input 124 of the exclusive NOR gate 126. This will cause a high pulse to appear on the lead 128, since the other input 125 to the exclusive NOR gate 126 is grounded, which will set the flip flop 130, causing the output on the lead 132 to go, and remain, high, because the other input 129 to the flip flop 130 is grounded through resistor 131. With a high signal on the output lead 132 at the input to the NOR gate 134, there will be a low signal on the lead 136 because the other input 133 to the NOR gate 134 is grounded through resistor 131. The lead 136 is connected to the reset input of the display counter module 102 and when a low signal appears thereon the display 50 is reset to zero. Once the flip flop 130 has been set, resulting in the display 50 being reset to zero, restoration of the leads 38 to normal operating conditions will have no effect because of the feedback 117 from the output of the gate 126 to the input of the gate 116. Thus, should a product thief attempt to tamper with the meter by disconnecting or shorting the leads 38, is prima facie evidence of tampering, even if transient, since the display 50 registers zero.

The only way of removing the zero reading from the display 50 after such tampering is to use the portable reset/preset unit 54. This reset/preset unit 54 is the property of the utility and is used by a product theft investigator to determine what caused the remote display 50 to go to zero. This investigator also reads the meter index, records that number into the reset/preset unit switches 58, removes the cover from the remote display unit 40, plugs the reset/preset unit connector 60 into the pin connector 52, pushes the reset button 56, waits for the preset number to register on the display 50, unplugs the reset/preset unit 54 from the remote display unit 40 and replaces the cover. The remote display unit 40 is now operational. As a final tampering deterent, the remote display unit 40 is so configured to hide the terminal strip 42 and pin connector 52 under a cover and utilizes tamper resistant seal plugs over the cover screws so that there is no means of entering the remote display unit 40 without outright destruction.

The reset/preset unit 54 is used to reset the flip flop 130 in the remote display unit 40 and to preset numbers into the display counter module 102 from the actual meter index reading. The reset/preset unit 54 has six thumb wheel BCD switches 58, which are commercially available, illustratively from EECO, Inc., of Santa Ana, Calif. The reset/preset unit 54 is a passive unit, having no internal power source. It is powered from the battery 62 in the remote display unit 54 when the connector 60 is inserted into the pin connector 52. When the reset/preset unit 54 is plugged into the pin connector 52, and the reset switch 56 is actuated, a reset pulse is provided on the lead 138 to reset the flip flop 130. A serial pulse string is then provided on the lead 140 to provide pulses for incrementing the display 50. The inputs 130 and 140 are protected by blocking resistors 139 and 141 to prevent possible static electrical damage to the NOR gate 96 and flip flop 130.

Figure 6:
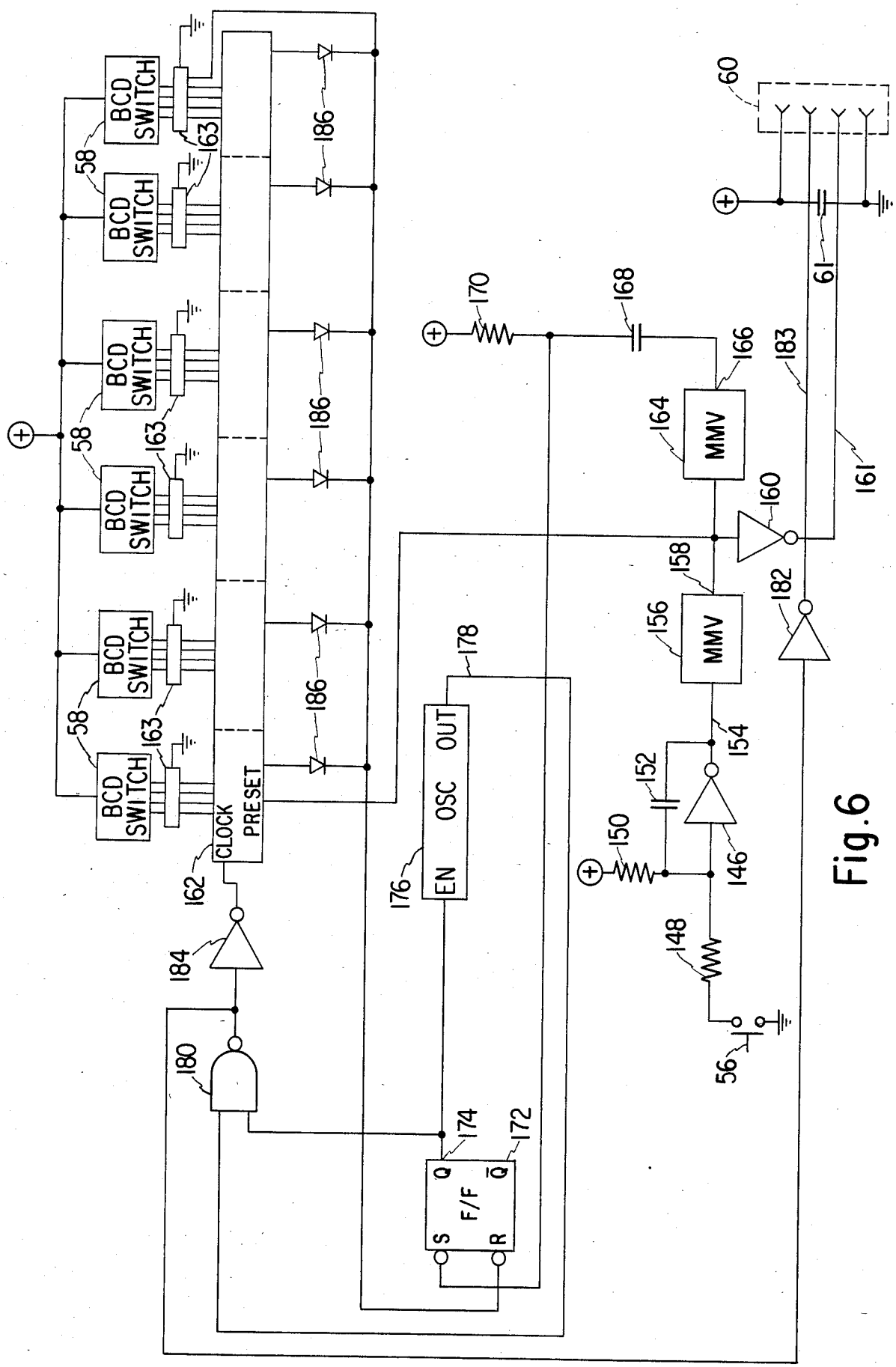
FIG. 6 is an electrical schematic circuit diagram showing illustrative circuitry for incorporation in a portable reset/preset unit in accordance with the principles of this invention.

Referring now to FIG. 6, shown therein is circuitry for the reset/preset unit 54. The unit 54 acts on the remote display 40 to clear the tamper detection flip flop 130, to provide a pulse through the NOR gate 134 to reset the display 50 to all zeros, and to set the display 50 to any number from 0 to 999,999 (assuming a six digit display), which number is usually made to agree with the meter index reading. The reset/preset unit 54 includes six thumb wheel BCD switches 58, one pushbutton reset switch 56 and a connector 60 to mate with the pin connector 52 of the remote display unit 40.

After connection of the reset/preset unit 54 to the remote display unit 40, which derives power and ground through the display unit 40 pin connector 52 through the reset/preset 54 connector 60, actuation of the grounded reset switch 56 places a low at the input of the inverter 146 through the current limiting resistor 148. The powered resistor 150 and the capacitor 152 act as a switch debounce circuit. The inverter 146 causes the low signal placed on its input by actuation of the switch 56 to become a high signal on the lead 154 which triggers the monostable multivibrator 156 which provides a low pulse at its output 158. This low pulse is inverted by the inverter 160 to provide the reset pulse on the lead 161 which resets the tamper detection flip flop 130 (FIG. 5) and resets the display 50 (FIG. 5) to all zeros. The low pulse at the output 158 also appears at the preset input of the cascaded down counters 162, which are illustratively type 40102B CMOS integrated circuits manufactured by RCA Corp. This causes the values set into the BCD switches 58 to be set into the down counters 162 through grounded resistor networks 163. The low pulse at the output 158 is also an input to the monostable multivibrator 164 which provides a low pulse at its output 166. This pulse is transmitted through the differentiating circuit consisting of the capacitor 168 and the powered resistor 170 to the set input of the flip flop 172. The output 174 of the flip flop 172 enables the oscillator 176 whose output on the lead 178 goes through the NAND gate 180, and through the inverter 182 to the lead 183 and into the remote display unit 40 (FIG. 5) over the lead 140. These pulses then pass through the NOR gate 96 to increment the display 50.

The pulses at the output of the NAND gate 180 also pass through the inverter 184 to the clock input of the down counters 162. The oscillator 176 continues to oscillate and provide pulses for incrementing the display 50 until the down counters 162 are all decremented to zero. At this time, the cathodes of the diodes 186 (which act as gates) go low and are kept low through a grounded resistor which is an unused resistor in the resistor network 163. This causes the flip flop 172 to be reset, causing a low signal to appear at the output 174, turning off the oscillator 176. Thus, the numbers set into the BCD switches 58 are now displayed on the display 50.

Thus, the aforedescribed objectives have been achieved. Simple and easy application of the remote display is made possible by using the self-locating adhesive-backed switch and attachable pointer magnet on the meter. The meter index cover is removed, the conversion made, and the cover is reinstalled with wires to the remote display unit exiting the cover through the "weep holes" at the bottom of the cover. Since power comes from the remote display itself, there is no requirement for accessing power from the customer. Because the installation of the switch and magnet fits within the enclosure of any meter and requires no equipment modifications, this arrangement is universally applicable as needed to any type, size, or manufacturer of meter. This is a significant benefit to a utility, especially a dual utility (i.e., electricity and gas) or a municipal utility (possibly having all three products), due to minimal inventory and installation training. The magnet/switch arrangement imposes no load on the meter which effects meter accuracy. Since the display unit is self contained for power and transmission, there is no need for line power, cable, telephone, etc. Since the current requirements along the wires 38 are so low, losses are negligable and there is virtually no limit to how far the remote display unit 40 may be from the meter.

Further, only a three wire cable is required between the meter and the display, with the third wire being a theft protection conductor. Since the switch-magnet is working with the "proving" pointer or odometer digit, the data rate on the display is typically 100 to 1,000 times the data rate possible by only showing the numbers used for product billing. While these least significant digits may be covered from viewing for the purpose of not confusing a meter reader, there is great benefit to the installer or investigator who is trying to determine if the system is working because it avoids having to put on a large load and waiting for an "event".

Setting the meter index reading into the remote display is very simple and easy and requires only seconds to implement, providing a major advantage over conventional systems.

The disclosed arrangement is highly reliable because of the quality and types of materials and components used and the wide operating temperature ranges of all the components. It is also reliable because the energy consumption is very low, in spite of continuous operation and display, so that 15 to 20 years operation in all environments without any maintenance is anticipated. Low battery condition is indicated by the LCD display 50 turning from black at normal voltage to gray at low voltage. A unique feature of this arrangement is the indication of product theft. The feature of having the display only being incremented, the detection of connecting conductor failure, and inaccessability to components all add up to significant deterence to product theft. Since the display is in continuous operation, the meter reader does not need to activate any special buttons.

Accordingly, there has been disclosed an arrangement for reproducing the reading of a meter at a location remote from the meter. It is understood that the above-described embodiment is merely illustrative of the application of the principles of this invention. Numerous other embodiments may be devised by those skilled in the art without departing from the spirit and scope of this invention, as defined by the appended claims.

We claim:

1. An arrangement for displaying the reading of a meter at a location remote from said meter comprising:
    switching means at said meter adapted to alternately close one of a pair of circuits each time a measured volume of metered product passes through said meter;
    a respective conductor connected to each of said circuits and extending to said remote location;
    a multidigit display unit;
    counting means coupled to said display unit for causing said display unit to display digits corresponding to the contents of said counting means, said counting means having a count input and a reset input, said counting means responding to a count signal at said count input for incrementing its contents and responding to a reset signal at said reset input for setting its contents to a predetermined value;
    pulse means coupled between said conductors and said count input for generating said count signal; and
    fault detection means coupled between said conductors and said reset input for generating and thereafter maintaining said reset signal when neither of said circuits is closed.

2. The arrangement according to claim 1 wherein said fault detection means is further effective to generate and thereafter maintain said reset signal in the event both said circuits are closed.

3. The arrangement according to claim 1 wherein said switching means includes a single pole double throw switch having a moveable pole and two fixed contacts and wherein said conductors include a respective conductor connected to said pole and each of said contacts, said arrangement further including a source of voltage coupled to said pole conductor and said pulse means is connected to said contact conductors.

4. The arrangement according to claim 1 wherein the meter includes a proving circle rotating on a shaft and said switching means includes a radially polarized circular magnet mounted axially on said shaft for rotation therewith.

5. The arrangement according to claim 1 further including manually controllable reset means for resetting said fault detection means to terminate the generation of said reset signal.

6. The arrangement according to claim 5 further including count setting means coupled to said counting means for providing the facility for manual entry of a predetermined count content into said counting means.

7. The arrangement according to claim 6 wherein said reset means and said count setting means are both included within an enclosure which is portable with respect to said remote display unit, said remote display unit including a connector coupled to said fault detection means and said counting means and said portable enclosure including a connector adapted to mate with the connector of said remote display unit.

8. The arrangement according to claim 7 wherein all power for said portable enclosure is supplied by said remote display unit through said connectors.

9. The arrangement according to claim 8 wherein said count setting means includes a plurality of digital switches through which an operator may set said predetermined count content.

10. The arrangement according to claim 9 wherein said portable enclosure includes a switch selectively closable by an operator and said reset means includes means responsive to closure of said switch for generating a pulse to reset said fault detection means.

11. The arrangement according to claim 10 wherein said count setting means includes:
a down counter;
means responsive to said pulse for setting said down counter with the count established by said digital switches;
a counting pulse generator;
means responsive to said pulse from said reset means for enabling said counting pulse generator;
means responsive to counting pulses from said counting pulse generator for decrementing said down counter;
means responsive to the contents of said down counter reaching zero for disabling said counting pulse generator; and
means for transmitting said counting pulses to the count input of said counting means.

* * * * *